United States Patent

[11] 3,586,999

| [72] | Inventor | Peter D. Southgate<br>Princeton, N.J. |
|---|---|---|
| [21] | Appl. No. | 768,150 |
| [22] | Filed | Oct. 16, 1968 |
| [45] | Patented | June 22, 1971 |
| [73] | Assignee | RCA Corporation<br>Continuation-in-part of application Ser. No.<br>689,459, Dec. 11, 1967, now abandoned. |

[54] FIELD-EXCITED SEMICONDUCTOR LASER WHICH USES A UNIFORMLY DOPED SINGLE CRYSTAL
13 Claims, 7 Drawing Figs.

[52] U.S. Cl. .................................................. 331/94.5,
29/569, 317/234
[51] Int. Cl. ................................................... H01s 3/18
[50] Field of Search ............................................ 29/569;
331/94.5, 234/27

[56] References Cited
UNITED STATES PATENTS

| 3,245,002 | 4/1966 | Hall .............................. | 331/94.5 |
| 3,258,596 | 6/1966 | Green ........................... | 250/199 |
| 3,303,432 | 2/1967 | Garfinkel et al. .............. | 331/94.5 |
| 3,309,553 | 3/1967 | Krolmer ........................ | 313/108 |
| 3,312,910 | 4/1967 | Offner ........................... | 331/94.5 |
| 3,330,957 | 7/1967 | Runnels ........................ | 250/199 |
| 3,341,937 | 9/1967 | Dill ................................ | 29/583 |
| 3,387,230 | 6/1968 | Marivace ....................... | 332/7.51 |
| 3,412,344 | 11/1968 | Pankore ........................ | 331/94.5 |
| 3,478,280 | 11/1969 | Fenner .......................... | 332/7.51 |
| 3,493,891 | 2/1970 | Fern et al. ..................... | 331/94.5 |

OTHER REFERENCES

Burns et al: PROC. IEEE, vol. 52, pp 770— 94, July, 1964
Tax: IEEE SPECTRUM, July, 1965, pp 62— 75
Melnzailis: APPLIED PHYSICS LETTERS, vol 6, pp 59— 60, Feb. 1965
Melnzailis: APPLIED PHYSICS LETTER, vol 5, pp 99— 100 Sept. 1964

*Primary Examiner*—Ronald L. Wibert
*Assistant Examiner*—Edward S. Bauer
*Attorney*—Glenn H. Bruestle ABSTRACT: A field-excited semiconductor infrared laser which comprises a single-crystal, uniformly doped body of N-type gallium arsenide or indium phosphide having opposed major faces optically flat and substantially parallel to each other, and means on opposite end portions of the body for passing an electrical current through the body.

INVENTOR
PETER D. SOUTHGATE
BY   W. S. Hill
           Agent

3,586,999

FIELD-EXCITED SEMICONDUCTOR LASER WHICH USES A UNIFORMLY DOPED SINGLE CRYSTAL

This application is a continuation-in-part of application Ser. No. 689,459, filed Dec. 11, 1967, and now abandoned.

The invention herein described was made in the course of, or under contract with the Air Force.

BACKGROUND OF THE INVENTION

Stimulated coherent radiation of light, both visible and infrared, has previously been obtained from solid state emitters such as crystals of ruby or of alkaline earth metal halides combined with certain rare earth elements. The equipment needed to produce the radiation has been bulky and complicated, however, since the crystal had to be stimulated externally with light to produce coherent radiation output.

Stimulated coherent radiation has also been previously obtained from semiconductor junction diodes made of III–V compounds such as gallium arsenide or indium phosphide. Gallium arsenide diodes designed for laser operation have been available commercially. Such diodes are field-excited and do not require external stimulation. The equipment needed to produce laser operation is therefore relatively compact and simple. But the radiation is obtained from a very small surface area which seriously limits the power output that can be obtained.

Field-excited radiation has been obtained from fairly heavily doped N-type gallium arsenide which is subjected to electric fields of the order of about 2,200 v./cm. and higher, but the radiation has lacked directionality. Coherent radiation, on the other hand, has been obtained from P-type gallium arsenide crystals stimulated externally by an electron beam and by external stimulation of a laser beam scattered by liquid nitrogen. Crystals of certain other III–V and II–VI semiconductor compounds have also been found to act similarly.

SUMMARY OF THE INVENTION

It has now been found that it is possible to generate coherent infrared radiation of unusually narrow bandwidth and high directionality throughout the whole volume of part of a specially prepared single crystalline body of uniformly doped gallium arsenide or indium phosphide. When an electric field of about 2,200 v./cm. is applied to a body of gallium arsenide, coherent, narrow-band infrared radiation having a wavelength near 3,400 A. is produced at a temperature of about 78° K. In this case, the body is uniformly doped with about 2—15×10$^{17}$ atoms/cm.$^3$ of at least one of selenium, tellurium, tin or similar N-type dopant. When an electric field of about 3,000 v./cm. is applied to a body doped with about 4—15×10$^{17}$ atoms/cm.$^3$ of the same elements, coherent, narrow band infrared radiation having a wavelength near 8,900 A. can be produced at about 300° K. (room temperature).

When an electric field of about 5,500 v./cm. is applied to a uniform body of indium phosphide, coherent, narrow-band infrared radiation having a wavelength near 8,900 A. can be produced at temperatures of about 78° K. In the case of indium phosphide, the crystal body contains on the order of 2×10$^{17}$ excess atoms/cm.$^3$ of one or more donor elements.

The crystal body that is used to generate the radiation has optically flat and substantially parallel major faces, and may be shaped to have a relatively narrow central portion and relatively wide end portions, although a simple bar-shaped body may also be used, in the case of indium phosphide.

THE DRAWING

DESCRIPTION OF preferred EMBODIMENT

Example I

Figure 1:
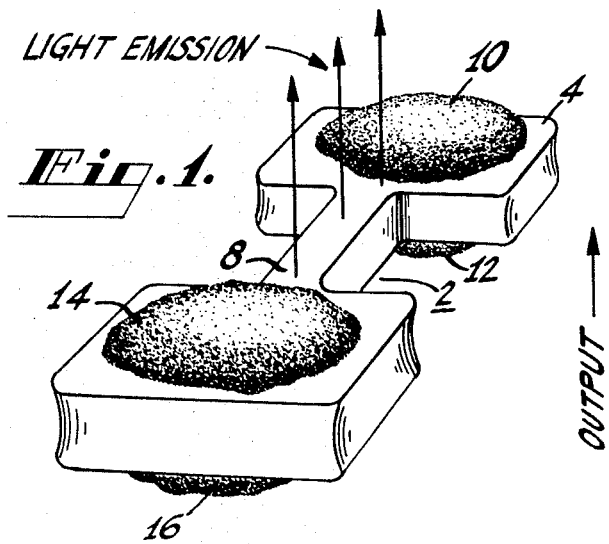
FIG. 1 is a perspective view of a crystal unit which represents an embodiment of the present invention.

A device of the present invention is illustrated in FIG. 1. The embodiment shown in the figure is a device 2 comprising single-crystal, N-type, melt-grown gallium arsenide doped with about 4×10$^{17}$ atoms/cm.$^3$ of tellurium. The device is elongated and includes enlarged end portions 4 and 6 and a narrow intermediate or waist portion 8. The width of the waist portion 8 is 0.1 mm. and the entire crystal unit has a thickness of 0.1 mm. The length of the waist portion 8 between the end portions 4 and 6 is 0.5 mm. The end portion 4 has alloyed indium contacts 10 and 12 on opposite major faces and the end portion 6 has similar indium contacts 14 and 16.

The device can be made as follows. A slice of the tellurium-doped gallium arsenide crystal is mechanically polished to a thickness of 0.15 mm. The slice is then further polished by a mechanical-chemical process using a bromine-methanol etch so that the major faces are flat and parallel to within 1 micron over limited areas, and have only a very small amount of mechanical surface damage. By this second polishing process the thickness of the slice is reduced to 0.1 mm. The mechanical polishing may be done on a conventional fabric polishing wheel using a fine polishing powder.

The polished slice is then mounted between glass slides. This may be done by coating both faces of the slice with any suitable etch-resistant paint, such as "Microstop" lacquer, and also similarly coating the faces of the glass slides between which the slice is to be mounted, baking the coated members until the lacquer becomes hard, then coating the lacquer-coated faces of the slice with glycol phthalate wax. The lacquer-coated faces of the slides are then pressed against the wax-coated faces of the slice and the assembly is heated slightly.

After the wax has cooled, the dumbbell-shaped pieces, which are slightly larger than the final device, are cut from the assembly with an ultrasonic tool. The upper and lower faces of the cutout piece are, of course, still protected with the lacquer, wax and glass.

Next, the cutout pieces are etched to final size with a solution that may comprise, in parts by volume, 6 parts concentrated nitric acid, 3 parts concentrated acetic acid, 1 part hydrofluoric acid and 5 parts water.

After the etching treatment, the protective glass wax and resin are removed from the crystal faces and the faces are cleaned to remove all traces of contamination.

Ohmic contacts are then made to the opposed faces of the enlarged end portions 4 and 6 of the crystal unit by alloying in pieces of indium at a temperature of 580° C. This forms the contacts 10, 12, 14 and 16.

Figure 2:
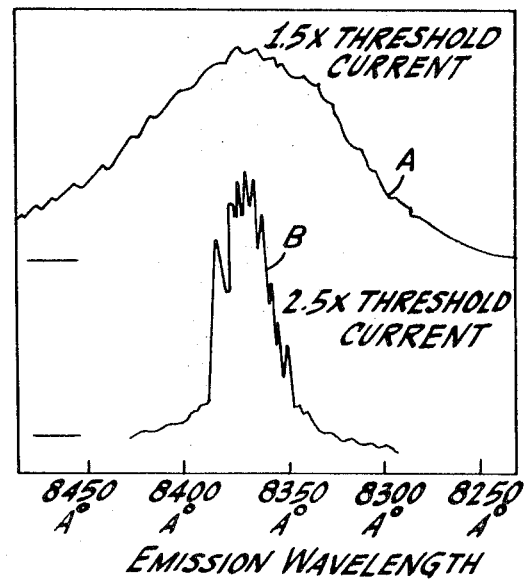
FIG. 2 is a graph of the emission spectra taken of crystal units as shown in FIG. 1.
Figure 4:
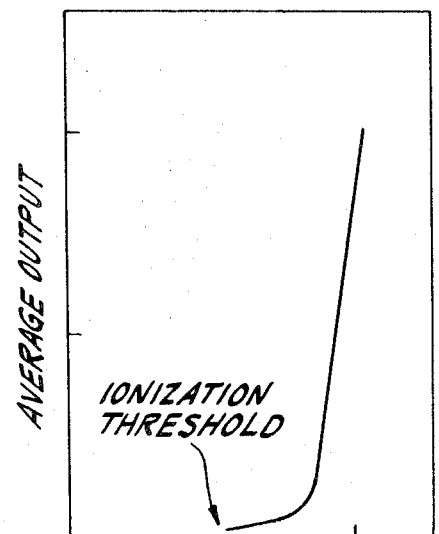
FIG. 4 is a graph of light flux along the axis of maximum emission plotted against current through the crystal for the device of FIG. 1.

The crystal unit shown in FIG. 1 can be excited in a 1 ohm strip line pulser using a mechanical relay which gives a pulse 10 n sec. long. The contacts 10 and 12 are connected in parallel to one output terminal of the pulsing unit and the contacts 14 and 16 are connected in parallel to the other output terminal of the unit. The crystal is maintained at a temperature of 78° K. At low current levels no light output occurs. But, as current is increased a threshold is reached, as shown in FIG. 4, where ionization begins to occur. This threshold current corresponds to a field of about 2,200 v./cm. in the waist portion of the crystal. Then, as current is further increased, ionization increases rapidly and a light output due to electron-hole recombination, as shown in Curve A of FIG. 2, is observed. This light is in the infrared region in the neighborhood of 8,400 A. but is about 200 A. in bandwidth and is also isotropic. That is, the light emission occurs in all directions from the crystal. This type of emission has been previously observed from gallium arsenide crystal units.

Figure 3:
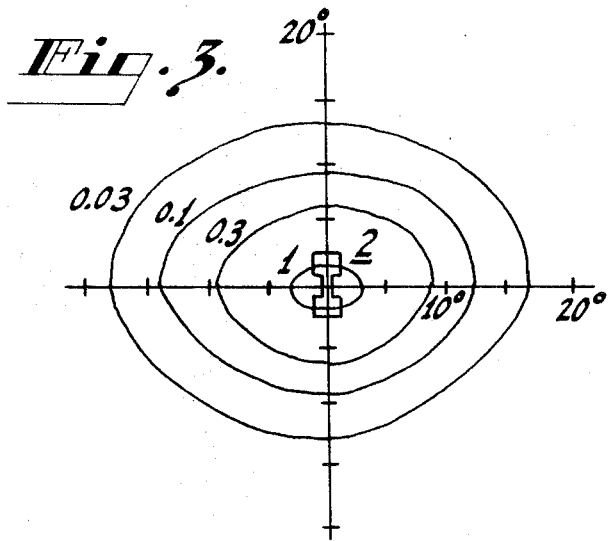
FIG. 3 is a polar diagram of the light emission from the device of FIG. 1, presented as constant flux curves.

Now, however, it has been found that if the current is increased to above 1.7 times the threshold level, several things happen. The spectrum bandwidth decreases to about 30 A., as shown in Curve B of FIG. 2, and the light output becomes highly directional as indicated by the arrows of FIG. 1 and, more specifically, by the polar diagram of FIG. 3. In this Figure, the dumbbell-shaped crystal 2 is shown at the center of the diagram. Strongest light emission is assumed to be perpendicular to the paper both toward and away from the reader. The ordinate and abscissa shows angle from the perpendicular drawn to the center of the crystal. The circles are tracings made of the observed relative radiation intensities recorded at various small angles around the perpendicular. Similar emission occurs at both the front face and the rear face of the body. As shown in FIG. 3, substantially all of the emission occurs within an angle of 8° around the perpendicular.

When the bandwidth of emission narrows down to 30° A., the light output duration for each 10 $n$ sec. pulse of current decreases from 10 $n$ sec. to about 2 $n$ sec.

Example II

Figure 6:
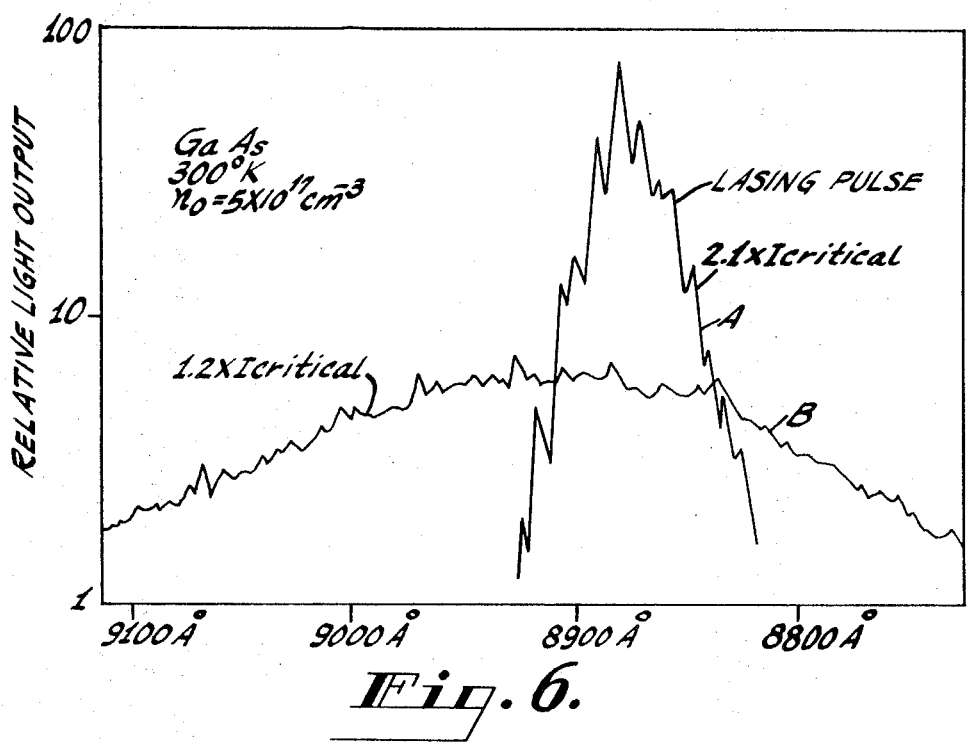
FIG. 6 is a graph of the emission spectrum showing both a lasing pulse and spontaneous emission emitted after the lasing pulse for a gallium arsenide unit at 300° K.

It has now also been found that coherent infrared radiation of narrow bandwidth and high directionality can be generated at room temperature (300° K.) from a uniformly doped crystal of gallium arsenide. In this case, the crystal body may be doped with 4 to $15 \times 10^{17}$ atoms/cm.$^3$ of a donor impurity such as selenium, tellurium or tin, and a field of about 3,000 v./cm. is applied. The radiation produced has a wavelength near 8,900 A. A graph of the emission spectrum of a typical specimen having a donor concentration of $5 \times 10^{17}$ atoms/cm.$^3$ is shown in FIG. 6. In an embodiment of this type the critical field for ionization is about 2,200 v./cm. when pulses of current from 5 to 20 $n$ sec. in duration are passed through the specimen, and coherent, stimulated emission is obtained when the current is at least 2.1 times the critical ionization value.

Curve A of the graph of FIG. 6 shows the time-averaged spectrum of coherent radiation emitted in brief pulses during or immediately after the current pulse. It is emitted in a narrow cone having a half-angle of 9°, normal to the polished face of the crystal body. Curve B of the graph of FIG. 6 shows the spontaneous noncoherent radiation which continues to be emitted for about 20 $n$ sec. after the pulse.

The shape of the crystal body in this Example is the same as that of Example I.

Example III

In accordance with another embodiment of the present invention it has also been found that infrared radiation of unusually narrow bandwidth and high directionality can be generated throughout the whole volume of part of a body of indium phosphide of uniform resistivity. Suitable indium phosphide crystals may be grown by the gradient freeze technique described by Richman in Willardson and Goering's book "Compound Semiconductors," Reinhold Publishing Company, New York, N.Y., 1962, pp. 216—220. Although ingots grown by this method are usually polycrystalline, single crystals of large enough size can be cut from the ingot. The crystals are N-type but the major donor impurity is not known. Crystals in which lasing action has been observed contain about $2 \times 10^{17}$ atoms/cm.$^3$ of the unknown donor substance.

A device can be made from this crystalline material as follows. A slice of the material is mechanically polished so that the major faces are flat and parallel to within one micron over limited areas, and have only a very small amount of mechanical surface damage. The thickness of the polished slice may be about 0.1 mm.

A rectangular bar-shaped piece 18 (FIG. 5) may then be cut from the slice by cleaving the sides with a razor blade. Ohmic contacts may then be made by alloying pieces of indium 19, 20, 21 and 22 to the top and bottom faces at both ends of the bar. Alloying is done at 400° C.

Figure 5:
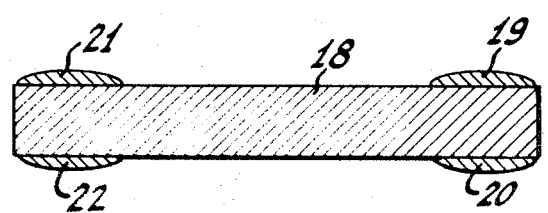
FIG. 5 is a section view of a crystal unit in accordance with another embodiment of the invention.

As in Example 1, the crystal unit shown in FIG. 5 can be excited in a 1 ohm strip line pulser using a mechanical relay which gives pulses 5 to 20 $n$ sec. long. The contacts 19 and 20 are connected in parallel to one output terminal of the pulsing unit and the contacts 21 and 22 are connected to the other output terminal of the unit. The crystal is maintained at a temperature of 78° K. The critical current for the InP crystal corresponds to a field of about 5,500 v./cm. As current is increased above this value ionization increases rapidly and a light output due to electron-hole recombination is observed. At a current which is about 1.2 × the critical value, the light output becomes coherent. The light is at a wavelength of about 8,900 A. and the spectrum bandwidth is about 25 A. The coherent light output occurs in beams directed normally to both polished and cleaved surfaces. Substantially all emission occurs within an angle of 5° around the perpendicular.

Figure 7:
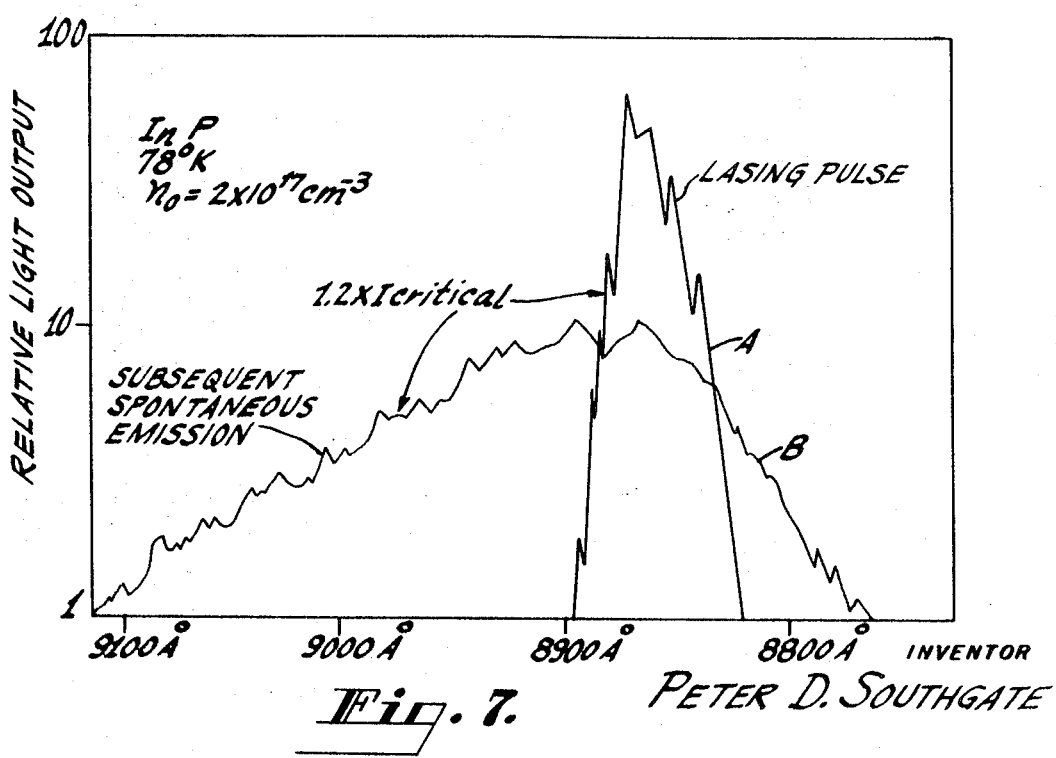
FIG. 7 is a similar graph for an indium phosphide unit at 78° K.

The stimulated emission light output duration for each 10 $n$ sec. pulse of current is about 2 $n$ sec. or less. l3ss. A graph of the stimulated emission and of the subsequent spontaneous emission is shown in FIG. 7. Curve A of the graph shows the light output for the lasing pulse and Curve B shows subsequent spontaneous emission.

What I claim is:
1. A semiconductor device capable of emitting unidirectional, coherent, narrow-band infrared radiation comprising
   a single crystal body of gallium arsenide doped uniformly with about $2-7 \times 10^{17}$ atoms/cm.$^3$ of N-type impurity,
   said body having a relatively narrow central portion and relatively wide end portions, and
   also having major faces on said central portion which are optically flat and substantially parallel to each other, and
   means for passing an electrical current between said end portions through said narrow central portion of said body so that said radiation is emitted from one of said faces.
2. A device according to claim 1 in which said impurity is tellurium, selenium or tin.
3. A device according to claim 1 in which said body has a thickness of about 0.1 mm. and the distance between said end portions is about 0.5 mm.
4. A method of generating unidirectional, coherent, narrow-band infrared radiation comprising:
   passing a current equal to at least about twice that needed to establish threshold ionization through a crystal unit which comprises a body of single crystal N-type gallium arsenide doped uniformly with $2-7 \times 10^{17}$ atoms/cm.$^3$,
   said body having relatively thick end portions connected by a relatively thin waist portion and said waist portion also having major faces which are substantially optically flat and parallel to each other, said current passing between said end portions through said waist portion so that said radiation is emitted from one of said faces.
5. A method according to claim 4 in which said current is passed in the form of brief pulses.
6. A method according to claim 5 in which said body is doped with tellurium, selenium or tin.
7. A semiconductor device capable of emitting unidirectional, coherent, narrow-band infrared radiation at ordinary room temperature, comprising
   a single crystal body of gallium arsenide doped uniformly with about $4-15 \times 10^{17}$ atoms/cm.$^3$ of an N-type impurity,
   said body having major faces optically flat on a relatively narrow central portion between two relatively wide end portions, and
   means for passing an electrical current between said end portions through said central portion so that said radiation is emitted from one of said faces.
8. A device according to claim 7 in which said means for passing an electrical current through the body comprises indium contacts on opposite ends of said body.

9. A device according to claim 7 in which said impurity is at least one of tellurium, selenium or tin.

10. A semiconductor device capable of emitting unidirectional, coherent, narrow-band infrared radiation, comprising a single crystal body of indium phosphide doped uniformly with about $2\times10^{17}$ atoms/cm.$^3$ of a donor impurity, said body having major faces optically flat on a relatively narrow central portion between two relatively wide end portions, and means for passing an electrical current between said end portions through said central portion so that said radiation is emitted from one of said faces.

11. A semiconductor device capable of emitting unidirectional, coherent, narrow-band infrared radiation comprising a single crystal body of gallium arsenide doped uniformly with about $2-15\times10^{17}$ atoms/cm.$^3$ of N-type impurity, said body having a relatively narrow central portion and relatively wide end portions, and also having major faces on said central portion which are optically flat and substantially parallel to each other, and means for passing an electrical current between said end portions through said narrow central portion of said body so that said radiation is emitted from one of said faces.

12. A method of generating unidirectional, coherent, narrow-band infrared radiation comprising:

passing a current equal to at least about 1.7 × that needed to establish threshold ionization through a crystal unit which comprises a body of single crystal N-type gallium arsenide doped uniformly with $2-15\times10^{17}$ atoms/cm.$^3$, said body having relatively thick end portions connected by a relatively thin waist portion and said waist portion also having major faces which are substantially optically flat and parallel to each other, said current passing between said end portions through said waist portion so that said radiation is emitted from one of said faces.

13. A method of generating unidirectional, coherent, narrow-band, infrared radiation comprising:

passing a current at least equal to that needed to establish threshold ionization through a crystal unit which comprises a body of single crystal N-type indium phosphide doped uniformly with about $2\times10^{17}$ excess atoms/cm.$^3$ of a donor impurity, at a temperature not higher than about 160° K., said body having relatively narrow central portion and relatively wide end portions, and also having major faces on said central portion which are optically flat and substantially parallel to each other, said current passing between said end portions through said central portion so that said radiation is emitted from one of said faces.

UNITED STATES PATENT OFFICE
CERTIFICATE OF CORRECTION

Patent No. 3,586,999                      Dated June 22, 1971

Inventor(s) Peter D. Southgate

It is certified that error appears in the above-identified patent and that said Letters Patent are hereby corrected as shown below:

Column 1, line 46, change "3,400A" to --8,400A--.

Column 4, line 21, delete "13ss".

Signed and sealed this 2nd day of November 1971.

(SEAL)
Attest:

EDWARD M. FLETCHER, JR.　　　　　　　ROBERT GOTTSCHALK
Attesting Officer　　　　　　　　　　Acting Commissioner of Patents